(12) United States Patent
Shen et al.

(10) Patent No.: US 9,879,980 B2
(45) Date of Patent: Jan. 30, 2018

(54) LIGHT BASED POSITIONING

(71) Applicant: MICROSOFT TECHNOLOGY LICENSING, LLC, Redmond, WA (US)

(72) Inventors: Guobin Shen, Beijing (CN); Liqun Li, Beijing (CN); Feng Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 14/488,246

(22) Filed: Sep. 16, 2014

(65) Prior Publication Data

US 2015/0377609 A1 Dec. 31, 2015

(51) Int. Cl.
| | | |
|---|---|---|
| *G01C 3/08* | (2006.01) | |
| *G01B 11/14* | (2006.01) | |
| *H05B 37/02* | (2006.01) | |
| *G01C 21/20* | (2006.01) | |
| *G01S 1/70* | (2006.01) | |
| *G01S 5/16* | (2006.01) | |

(52) U.S. Cl.
CPC ............. *G01B 11/14* (2013.01); *G01C 3/08* (2013.01); *G01C 21/20* (2013.01); *G01S 1/70* (2013.01); *G01S 5/16* (2013.01); *H05B 37/0227* (2013.01)

(58) Field of Classification Search
CPC .......... G01B 11/14; G01C 3/08; G01C 21/20; G01S 1/70; G01S 5/16; H05B 37/0227
See application file for complete search history.

(56) References Cited

U.S. PATENT DOCUMENTS

| | | | |
|---|---|---|---|
| 7,969,297 B2 | 6/2011 | Haartsen et al. | |
| 8,416,290 B2 | 4/2013 | Ryan et al. | |
| 8,437,769 B1 | 5/2013 | Sarkar et al. | |
| 8,510,033 B2 | 8/2013 | Park et al. | |
| 2011/0176803 A1 | 7/2011 | Song et al. | |
| 2012/0022826 A1 | 1/2012 | Giesekus | |
| 2012/0249013 A1* | 10/2012 | Valois ............... | H05B 37/0227 315/291 |

(Continued)

FOREIGN PATENT DOCUMENTS

| | | |
|---|---|---|
| CN | 102901512 A | 1/2013 |
| CN | 103389488 A1 | 11/2013 |

(Continued)

OTHER PUBLICATIONS

"International Search Report and Written Opinion Issued in PCT Patent Application No. PCT/CN2014/081227", dated Mar. 27, 2015, 16 Pages.

(Continued)

*Primary Examiner* — Samantha K Abraham

(57) ABSTRACT

The subject matter described herein relates to light based positioning. In one embodiment, a method comprises: responsive to receiving a light signal from at least one light source available to the device, decoding a beacon from the received light signal, the beacon associated with the at least one light source; measuring signal strength of the received light signal; and determining a position of the device at least in part based on the decoded beacon, the measured signal strength, and number of the at least one light source. In addition, the frequency channelization and random channel hopping may be utilized to further improve the performance.

20 Claims, 4 Drawing Sheets

(56) References Cited

U.S. PATENT DOCUMENTS

2012/0321318 A1* 12/2012 Xu .................. H04L 5/0012
398/76
2014/0003823 A1 1/2014 Roberts et al.

FOREIGN PATENT DOCUMENTS

| CN | 103592622 A | 2/2014 |
|----|-------------|--------|
| JP | 2009244218 A | 10/2009 |
| WO | 2009106440 A1 | 9/2009 |
| WO | 2011064332 A1 | 6/2011 |

OTHER PUBLICATIONS

Vegni, et al., "An Indoor Localization Algorithm in a Small-Cell LED-based Lighting System", In Proceedings of International Conference on Indoor Positioning and Indoor Navigation, Nov. 13, 2012, 7 pages.
Prince, et al., "A Two Phase Hybrid RSS/AoA Algorithm for Indoor Device Localization using Visible Light", MCL Technical Report No. 09-19-2012, Sep. 19, 2012, 16 pages.
"ByteLight", Mar. 31, 2014 Available at: http://www.bytelight.com/.
"M-Audio", Mar. 31, 2014 Available at: http://www.m-audio.com/.
Bahl, et al., "Radar: An in-Building RF-Based User Location and Tracking System", In Proceedings of Nineteenth Annual Joint Conference of the IEEE Computer and Communications Societies, Mar. 26, 2000, pp. 775-784.
Barry, John R., "Wireless Infrared Communications", In Proceedings of IEEE, Aug. 31, 1994, 3 pages.
Chen, et al., "FM-based Indoor Localization", In Proceedings of the 10th International Conference on Mobile Systems, Applications, and Services, Jun. 25, 2012, 13 pages.
Chintalapudi, et al., "Indoor Localization without the Pain", In Proceedings of the Sixteenth Annual International Conference on Mobile Computing and Networking, Sep. 20, 2010, 12 pages.
Chung, et al., "Indoor Location Sensing using Geo-Magnetism", In Proceedings of the 9th International Conference on Mobile Systems, Applications, and Services, Jun. 28, 2011, pp. 141-154.
"Cree", Mar. 31, 2014 Available at: http://www.cree.com/.
Giustiniano, et al., "Low-Complexity Visible Light Networking with Led-to-Led Communication", In Proceedings of IFIP Wireless Days, Nov. 21, 2012, 8 pages.
Hu, et al., "Pharos: Enable Physical Analytics through Visible Light Based Indoor Localization", In Proceedings of the Twelfth ACM Workshop on Hot Topics in Networks, Nov. 21, 2012, pp. 1-7.
Komine, et al., "Fundamental Analysis for Visible-Light Communication System using Led Lights", In Proceedings of IEEE Transactions on Consumer Electronics, vol. 50, No. 1, Feb. 2004, pp. 100-107.
O'Brien, et al., "Visible Light Communications: Challenges and Possibilities", In Proceedings of IEEE 19th International Symposium on Personal, Indoor and Mobile Radio Communications, Sep. 15, 2008, pp. 1-5.
Panta, et al., "Indoor Localisation using White Leds", In Proceedings of Electronic Letters, vol. 48, No. 4, Feb. 16, 2012, 2 pages.
"A Long Lifespan I LED", Mar. 31, 2014 Available at: http://www.lumec.com/newsletter/architect_06-08/led.htm.
Rahman, et al., "High Precision Indoor Positioning using Lighting Led and Image Sensor", In Proceedings of 14th International Conference on Computer and Information Technology, Dec. 22, 2011, 6 pages.
Rajagopal, et al., "IEEE 802.15. 7 Visible Light Communication: Modulation Schemes and Dimming Support", In Proceedings of IEEE Communications Magazine, vol. 50, Issue 3, Mar. 2012, pp. 72-82.
"Energy Star®", Mar. 31, 2014 Available at: https://www.energystar.gov/.
Suli, et al., "An Introduction to Numerical Analysis", In Proceedings of Cambridge University Press, Sep. 8, 2003, 444 pages.
Whitehouse, et al., "Exploiting the Capture Effect for Collision Detection and Recovery", In Proceedings of the 2nd IEEE Workshop on Embedded Networked Sensors, Apr. 30, 2005, pp. 1-8.
Xiong, et al., "Towards Fine-Grained Radio-Based Indoor Location", In Proceedings of the Twelfth Workshop on Mobile Computing Systems & Applications, Feb. 28, 2012, 6 pages.
Xiong, et al., "Arraytrack: a Fine-Grained Indoor Location System", In Proceedings of the 10th USENIX Conference on Networked Systems Design and Implementation, Apr. 2, 2013, pp. 71-84.
Yoshino, et al., "High Accuracy Positioning System using Visible Led Lights and Image Sensor", In Proceedings of IEEE Radio and Wireless Symposium, Jan. 22, 2008, pp. 439-442.
Youssef, et al., "The Horus WLAN Location Determination System", In Proceedings of the 3rd International Conference on Mobile Systems, Applications, and Services, Jun. 6, 2005, 14 pages.
Zhang, et al., "A 2-D Indoor Localization System Based on Visible Light Led", In Proceedings of IEEE Photonics Society Summer Topical Meeting Series, Jul. 9, 2012, pp. 80-81.
Li, et al., "Epsilon: A Visible Light Based Positioning System", In Proceedings of 11th USENIX Symposium on Networked Systems Design and Implementation, Mar. 31, 2014, pp. 1-13.
"HotNets—XII", In Proceedings of Twelfth ACM Workshop on Hot Topics in Networks, Nov. 21, 2013, 1 page.
"Office Action Issued in European Patent Application No. 14896800.1", dated Jun. 29, 2017, 9 Pages.
"Supplementary Search Report Issued in European Patent Application No. 14896800.1", dated May 31, 2017, 4 Pages.
Youssef, et al., "The Horus Location Determination System", In Journal of Wireless Networks, vol. 14, Issue 3, Jun. 2008, pp. 357-374.

* cited by examiner

LIGHT BASED POSITIONING

RELATED APPLICATIONS

This application claims priority to International Application No. PCT/CN2014/081227, filed on Jun. 30, 2014, and entitled "LIGHT BASED POSITIONING." This application claims the benefit of the above-identified application, and the disclosure of the above-identified application is hereby incorporated by reference in its entirety as if set forth herein in full.

BACKGROUND

Location-based services have been applied in varied scenarios, for which accurate positioning is a key issue. Satellite based positioning services, such as Global Positioning System (GPS) and Galileo system, are capable of provide accurate positions of target objects in outdoor environment. However, as known, such satellite based solutions are not applicable for indoor positioning. As an example, GPS loses significant power when passing through construction materials, and suffers from multi-path propagation effects that make it unsuitable for indoor environment.

It has been proposed to leverage existing WiFi or Bluetooth wireless communication infrastructure to provide indoor positioning services. Although WiFi based positioning solutions may be deployed and used with relatively low costs, they only provide accuracy of up to few meters suffering from wireless channel dynamics, fading, interference and environmental noises. For example, complex indoor environments cause radio waves to propagate in dynamic and unpredictable ways, limiting the accuracy of such positioning systems. As a result, positioning solutions based on wireless communications cannot meet requirements of many applications.

SUMMARY

Positioning can be done based on light communications. For example, a light source at a known position may broadcast its identification by modulating its light signal, either visible or invisible (e.g., infrared). If a mobile device detects the identification of a light source in the captured light information, it can be determined that the mobile device is now located within a proximity of the light source. However, without accurately measuring the distance between the mobile terminal and the light source, such coverage-based method is only capable of providing a rough estimate of position. For example, when the light source is located far away from the mobile terminal, the accuracy will significantly drop. As a result, positioning with high accuracy (for example, at sub-meter level) and low costs remains a big challenge, especially for indoor environments.

Embodiments of the subject matter described herein generally relate to a positioning solution based on light communications.

In one embodiment, when a device such as a mobile device receives light signals from one or more light sources, respective beacons associated with the light sources may be decoded from the received light signal, and the signal strength of each received light signal may be measured. Then the position of device may be determined at least in part based on the decoded beacons, the measured signal strength, and number of the available light sources.

In another embodiment, one or more light sources may use random channel hopping to broadcast light signals to the device, such that the device can determine its position based on the light communications. For a predefined hopping period, a light source may randomly select an optical channel from a plurality of optical channels with different spectral ranges. The light signal may be modulated to encode an associated beacon. Then the light source emits the light signal with the encoded beacon on the selected optical channel.

In accordance with the subject matter described herein, by measuring signal strength of the light signals from one or more light sources, accuracy of positioning may be improved compared with coverage-based approaches. Moreover, the number of available light sources is taken into account, such that different manners for positioning may be adaptively selected for different environmental arrangements and/or conditions. As such, even with the limited number of light sources, the position of mobile device may be accurately determined. Additionally, by means of frequency channelization and random channel hopping at the light source side, the collision and waiting time may be significantly reduced or eliminated. As a result, the device can be positioned accurately and efficiently.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
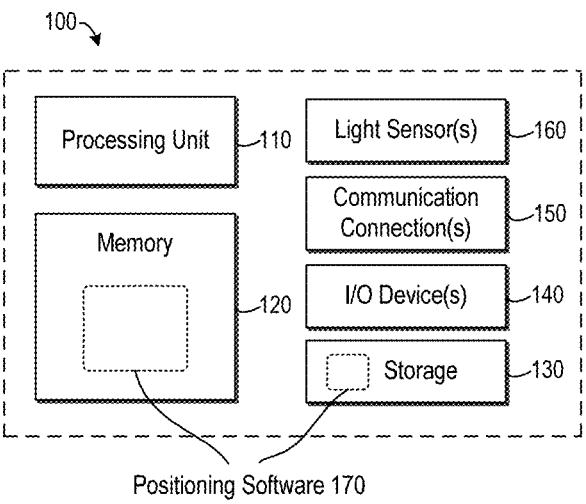
FIG. 1 illustrates a block diagram of a device in accordance with one embodiment of the subject matter described herein.

FIG. 1 illustrates a block diagram of a device 100 in accordance with one embodiment of the subject matter described herein. In one embodiment, the device 100 may be a mobile device. Examples of the mobile devices include, but not limited to, mobile phones, laptop computers, handheld computing devices, tablet computers, personal digital assistances (PDAs), wearable devices like glasses and watches, and so forth. It is to be understood that the device 100 shown in FIG. 1 is not intended to suggest any limitation as to scope of use or functionality of the subject matter described herein, as various embodiments may be implemented in diverse general-purpose or special-purpose mobile devices. Specifically, although some embodiments will be discussed with reference to a mobile device, the scope of the subject matter described herein is not limited thereto. In other embodiments, the device 100 may be a fixed device like a personal computer (PC) or any suitable digital appliance capable of sensing and processing light signals, no matter currently known or developed in the future.

With reference to FIG. 1, the device 100 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores at least a part of positioning software 170.

The device 100 may have additional component or features. In the example shown in FIG. 1, the device 100 includes storage 130, one or more input/output (I/O) devices 140, one or more communication connections 150, and one or more light sensor(s) 160. An interconnection mechanism (not shown) such as a bus, controller, or network interconnects the components of the device 100. Typically, operating system software (not shown) provides an operating environment for other software executing on the device 100, and coordinates activities of the components of the device 100.

The storage 130 may be removable or non-removable, and may include computer-readable storage media which can be used to store information and which can be accessed within the device 100. The storage 130 may store at least a part of the positioning software 170.

The I/O device(s) 140 may include one or more of various different input devices that can be used to provide input to the device 100. For example, the input device(s) may include a user device such keyboard, keypad, touch pad, trackball, etc. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence. The output devices may be a display, speaker, network adapter, or another device that provides output from the device 100. For example, the display may be a touch-sensitive display.

The communication connection(s) 150 enables communication over a communication medium to another computing entity. Additionally, functionality of the components of the device 100 may be implemented in a single computing machine or in multiple computing machines that are able to communicate over communication connections. Thus, the device 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The light sensor(s) 160 may include any types of suitable devices which can be used to sense, receive, detect, and/or process the light signal. Specifically, the light sensor(s) 160 may sense light from one or more light sources, which may be visual light or in some cases other frequencies such as infrared, etc. When the light signal is modulated to encode information, the light sensor(s) 160 may operate, in cooperation with the processing unit 110, to perform corresponding demodulation process to decode the information from the light signal.

Embodiments of the subject matter can be described in the general context of computer-readable media, which may be storage media or communication media. Computer-readable storage media are any available storage media that can be accessed within a device, but the term computer-readable storage media does not refer to propagated signals per se. By way of example, and not limitation, with the device 100, computer-readable storage media include memory 120, storage 130, and combinations thereof.

Embodiments of the subject matter can be described in the general context of computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed device. In a distributed device, program modules may be located in both local and remote computer storage media.

Figure 2:
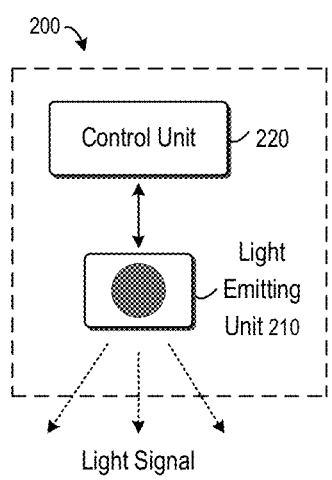
FIG. 2 illustrates a block diagram of a light source device in accordance with one embodiment of the subject matter described herein.

FIG. 2 shows a block diagram of a light source 200 in accordance with one embodiment. As shown, the light source 200 comprises a light emitting unit 210 and a control unit 220. The light emitting unit 210 may be any device or element that can emit light, which in the examples below is described using visible light, but can be any suitable light such as infrared, etc. By way of example, in one embodiment, the light emitting unit 210 is implemented by a light emitting diode (LED). A LED is a simple semiconducting device that can emit light signals with high energy efficiency. The lifetime of LEDs is much longer than that of the conventional incandescent lighting devices. Moreover, the LEDs are free of mercury and thus environment friendly. As a semiconductor device, the LEDs possess a feature of instantaneous on and off. That is, a LED lamp may be toggled within few microseconds. Modulation process such as pulse width modulation (PWM) may be used to frequently turning on/off the LED. In this event, the brightness of the LED is determined by the duty cycle. The instantaneous on/off feature turns the LED into an effective transmitter for visible light communication.

In the following, some embodiments will be described with reference to the LED(s). However, this is only for the purpose of illustration without suggesting any limitations as to scope of the subject matter described herein. For example, in alternative embodiments, the light emitting unit 210 may be an Organic Light Emitting Diode (OLED) or a laser. It is to be understood that any suitable lighting devices, no matter currently known or developed in the future, may function as the light emitting unit 210.

The control unit 220 controls operation of the light source 200, including but not limited to light emission, modulation, beaconing and/or any other aspects. The control unit 220 may be implemented by hardware, software, firmware and/or any combination thereof. For example, in one embodiment, the control unit 220 is embodied as a control circuit. Specifically, the control circuit 220 may dynamically receive configuration information and configure the light source 200 on the fly. Example embodiments in this regard will be discussed later. Moreover, it is to be understood that the light emitting unit 210 and the control unit 220 are not necessarily implemented as separate entities as shown in FIG. 2. Instead, they may be co-located within a single device.

Figure 3:
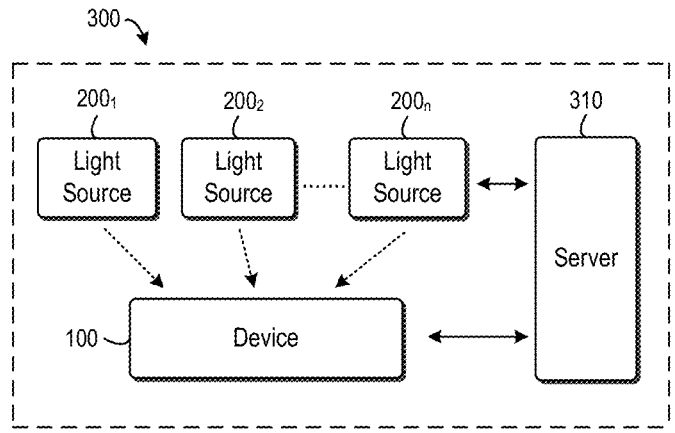
FIG. 3 illustrates a block diagram of a system in accordance with one embodiment of the subject matter described herein.

FIG. 3 illustrates an example of a system 300 in accordance with one embodiment of the subject matter described herein. The system 300 may be an indoor environment, for example, a room. As shown, the device(s) 100 is located at a certain position in the system 300. Only for the purpose of illustration without any limitations, in the following discussion, the device 100 will be described as a mobile device. However, as mentioned above, the device 100 may be a fixed device as well.

Moreover, one or more light sources $200_1, 200_2, \ldots, 200_n$ (collectively referred to as "light source 200") are arranged in the system 300. In one embodiment, the light sources 200 may be the ones that have already deployed in an illumination system. That is, it is possible to reuse the existing illumination system to determine the position of the mobile device 100. As a result, the positioning can be done in a "plug-and-play" manner with very low costs. Additionally, in order to avoid potential flickering problem in the light communication, in one embodiment, frequency of the light source 200 may be set higher than a frequency which is detectable by humans, such as above 100 Hz or at approximately 200 Hz, for example.

With reference to FIG. 3, in some embodiments, the system 300 may include a compute/server 310 which may be part of the control system associated with the light source, associated with the device itself, and/or communicatively coupled to the device. The server 310 may communicate with the mobile device 100 and/or the light source(s) 200 and store any information required for determining position of the mobile device 100. For example, in one embodiment, the server 310 stores associations between one or more light sources 200 and respective position information. In such embodiment, the mobile device 100 may access the server 310 to retrieve the position information of one or more light sources 200, which will be discussed later.

It is to be understood that though the server 310 is shown as being located in the system 300, the subject matter described herein is not limited in this regard. For example, in an alternative embodiment, the server 310 may be remotely located to the mobile device 100 and/or the light sources 200. In fact, some embodiments may be applied even without the server 310 shown in FIG. 2. In such embodiments, the position information and possible other relevant information of light sources 200 may be stored locally at respective light sources 200 and provided to the mobile device 100 when necessary; alternatively, all or portions of the server functionality and/or the position information and other possible relevant information may be provided within the mobile device 100. Moreover, configurations of the light sources 200 may be provided and/or updated by light communication, for example. Therefore, the positioning may be done without reliance on any centralized service.

Figure 4:
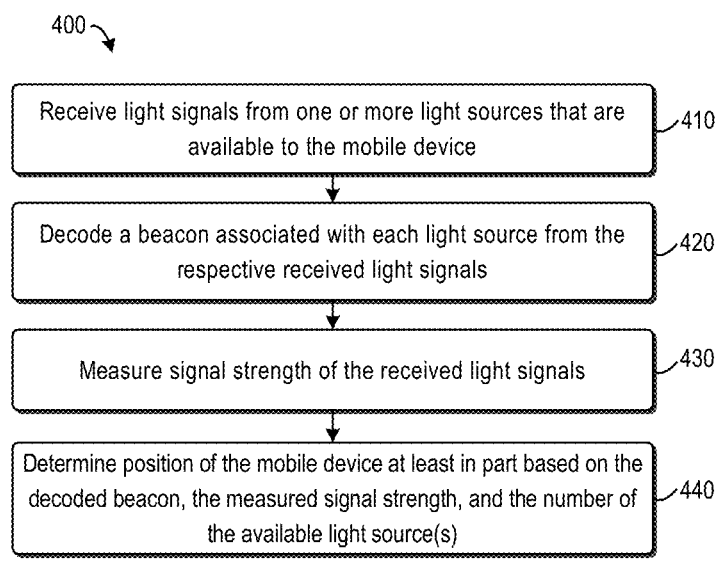
FIG. 4 illustrates a flowchart of a method that is implemented at least in part by a device in accordance with one embodiment of the subject matter described herein.

Reference is now made to FIG. 4 which shows a flowchart of a method 400 that is implemented at least in part by the device 100 such as a mobile device. For example, the software 170 may be executed to carry out steps of the method 400.

The method 400 is entered at step 410 where the light signals are received from one or more of the light sources 200 that are available to the mobile device 100. An available source 210 refers to a light source the light from which can be observed or perceived by the light sensor 160 of the mobile device 100. It would be appreciated that in different environments, the number of light sources 200 available to the mobile device 100 may be different.

In response, for the light signal from an available light source 200, a beacon associated with that light source 200 is decoded at step 320. As will be discussed later, a light source 200 may generate a beacon that includes any information specific to the light source 200 for use in positioning. The generated beacon may include identification, position information or any other information associated with the light source 200. Such information may be used for determining the position of the mobile device 100. Examples of the information included in the beacon will be discussed later.

At the light source 200, the generated beacon is encoded into the light signal by a modulation process. By the way of example, a LED may adopt binary frequency shifting keying (BFSK) modulation to encode the beacon and any other message. Other modulation schemas are possible as well, including but not limited to on-off keying (OOK), variable pulse-position modulation (VPPM), color shift keying (CSK), or the like. Then the beacon is broadcasted by the light signal emitted from the light source 200. At the mobile device 100, corresponding demodulation process is applied on the received light signal to decode the beacon.

With reference to FIG. 4, the method 400 then proceeds to step 430, where the signal strength of the light signals received at step 410 is measured. The signal strength may be represented as a RSSI (received signal strength indicator) and may be measured in any suitable manners. For example, in one embodiment, the mobile device 100 measures the energy or magnitude of the received light signals. Specifically, depending on the specific manner for determining the position of the mobile device 100, the signal strength measured at step 430 may be the magnitude of one or more certain frequency components of the received light signal. For example, in one embodiment which will be discussed below, magnitude of the baseband frequency component of the received light signal is measured at step 330 to serve as the signal strength. Additionally, it is to be understood that steps 420 and 430 may be performed in any order or in parallel. For example, upon receipt of a light signal, it is possible to decode the beacon while measuring the signal strength.

At step 440, the position of the mobile device 100 is determined at least in part based on the beacon decoded at step 420, the signal strength measured at step 430, and the number of light sources 200 that are currently available to the mobile device 100. Contrary to those coverage-based methods, the signal strength is used to derive the exact position of the mobile device 100 rather than a rough estimate. Further, the specific manner for positioning is flexibly and adaptively selected depending on the number of available light source 200. As a result, the accuracy and reliability of the positioning are significantly improved.

In some embodiments, a model-based approach is utilized at step 440 to determine the position of the mobile device 100. Generally, in such embodiments, a light propagation model is established in advance to at least associate the propagation distance of the light signal and the received signal strength. By substituting the received signal strength measured at step 430 into the model, the distances between the mobile device 100 and the available light sources 200 may be derived. Additionally, positions of the available light sources 200 may be obtained from the decoded beacon. Given the distances between the mobile device 100 and one or more light source 200 and the positions of these light sources 200, the exact position of the mobile device 100 may be determined in a respective manner depending on the number of available light source 200.

Specifically, in the model-based positioning, it is necessary to have the mobile device 100 know the positions of the available light sources 200. In one embodiment, a light source 200 knows its position and may directly encode the position information into its beacon. For example, the position may be represented by spatial coordinate <x, y, z>. Accordingly, the mobile device 100 may read the position of any light source 200 from its beacon decoded at step 420.

In an alternative embodiment, instead of the position information per se, the beacon includes the identification of the light source 200 which can uniquely identify the light source 200. Associations between the identifications and positions of the respective light sources 200 are determined and stored in advance, such as in the server and/or mobile device described above. The association between the identifications and positions may be provided to the mobile device in any suitable manner such that the mobile device 100 is able to determine the position of an available light source 200 based on the identification. In one embodiment, such associations are stored locally at the mobile device 100. Alternatively, the associations may be stored remotely, for example, at the server 310 in FIG. 3. In the latter case, the mobile device 100 may access the server 310 via the communication connection(s) 150 to retrieve positions of one or more available light source 200 with their respective identifications.

Given the light propagation model characterizing the relationship between the light propagation distance and the received signal strength, the signal strength measured at step 430 may be input to the model to obtain the distance between the mobile device 100 and any of the available light sources 210. In some embodiments, such a distance is explicitly calculated. Alternatively, it is also possible to utilize the distance(s) implicitly, for example, by representing the distance(s) by the position of the mobile device 100. Example embodiments in this regard will be discussed later.

Then, for an available light source 200, a spatial sphere may be determined where the position of the light source 200 is the center and the distance between the mobile device 100 and that light source 200 is the radius. It would be appreciated that the mobile device 100 is located on a certain position on surface of this sphere. Depending on the number of light sources 200 that are currently available to the mobile device 100, the exact spatial position of the mobile device 100 may be determined in adaptive manner. For example, if the number of available light sources 200 is greater than or equal to a predefined threshold (for example, three or four), trilateration or multilateration may be applied. Otherwise, if the number of available light source 200 is below the threshold number, it is possible to get a user of the mobile device 100 involved to provide additional information, for example, via one or more gestures of the mobile device 100 to facilitate the positioning. Otherwise, if the number of available light sources is below the threshold number, an estimation of the location based on prior known locations of the device or other relevant information may be determined.

Figure 5:
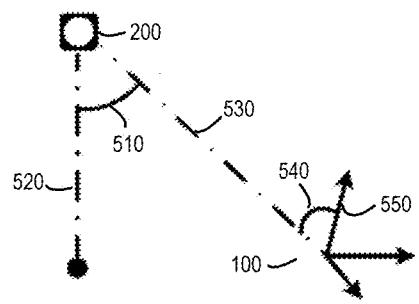
FIG. 5 illustrates a schematic diagram of irradiation angle and incidence angle n accordance with one embodiment of the subject matter described herein.

Only for the purpose of illustration, a specific example will now be discussed. In this example, the light propagation model is established as follows. For an optical channel, the signal strength of the received light signal may be characterized by the transmission power of the light source, the channel gain and the receiver gain. By way of example, in one embodiment, the received signal strength may be described as:

$$P_r = P_t \cdot H(d) \cdot G_r \quad (1)$$

where $P_t$ represents transmission power of the light source 200 over a certain optical channel, $H(d)$ represents gain of the optical channel, and $G_r$ represents gain at the mobile device 100. In one embodiment, the receiver gain $G_r$ is calibrated in advance and used as a constant in operation. The channel gain $H(d)$ is a function of the light propagation distance (denoted as d), irradiation angle of the light (denoted as $\varphi$) and incidence angle of the light (denoted as $\theta$). As shown in FIG. 5, the irradiation angle $\varphi$ refers to the angle 510 between the vertical direction 520 and direction of the light propagation path 530 from the light source 200 to the mobile device 100. The incidence angle $\theta$ refers to the angel 540 between the direction of the light propagation path 530 and the normal 550 of a plane defined by the surface of the mobile device 100.

In one embodiment, the radiant intensity is assumed to follow a Lambertian radiation pattern. Accordingly, the channel gain $H(d)$ may be modeled as follows:

$$H(0) = A \cdot g(\phi) \cdot \left[\frac{m+1}{2\pi}\right] \cdot \cos^m\phi \cdot \frac{\cos\theta}{d^2} \quad (2)$$

where A represents the area of the light sensor 160, $g(\varphi)$ represents an optical concentrator which is a constant if the incidence angle $\theta$ falls in the field of view (FoV) of the light sensor 160, and m represents the Lambertian order. Such model is verified by experiments and all the constants may be well defined in advance. For example, in one embodiment where the light sources 200 are typical LED bulbs, the illumination range is limited within [−60°, +60°], and the parameter m is set to 1.

As to the emission power $P_t$ of the light source 200, by way of example, the light signal emitted by the light source 200 is a 0-1 pulse wave when the light source 200 adopts PWM modulation. For the period T with pulse time t, the Fourier series expansion for the pulse wave is:

$$f(t) = \frac{\tau}{T} + \sum_{n=1}^{\infty} \frac{2}{n\pi}\sin\left(\frac{\pi n\tau}{T}\right)\cos\left(\frac{2\pi n}{T}t\right) \quad (3)$$

where the first AC component is corresponding to the emission power on the baseband frequency component. That is, the emission power $P_t$ spreads over the baseband and all the harmonics. In practice, it is difficult or infeasible to measure the overall received energy. Accordingly, in some embodiments, measurement of the signal strength at step 430 may be performed only with respect to the baseband frequency component of the received light signal.

For example, in one embodiment, the magnitude of the baseband frequency component of the received light signal is measured at step 430 to serve as the strength signal. This is feasible because the portion of energy over the baseband optical channel is already sufficient to validate the channel model as represented by the equation (2). As such, the light propagation model may be defined as follows:

$$P_r = C \cdot \sin\left(\frac{\tau}{T}\pi\right) \cdot \frac{\cos\theta \cdot \cos\phi}{d^2} \quad (4)$$

where C represents a constant related to the maximum emission power of the light source 200, and $\tau/T$ represents the duty cycle of the light source 200 which is a primary factor for affecting the transmission power $P_t$ of the light source 200.

In this embodiment, in order to enable the mobile device 100 to determine its position, the constant C and the duty cycle $\tau/T$ of the light source 200 to the mobile device 100. In one embodiment, information about the constant C and/or the duty cycle $\tau/T$ is included in the beacon of the light source 200. In this way, the mobile device 100 may read such information after decoding the beacon at step 420. It is also possible to provide these parameters to the mobile device 100 in alternative manners. For example, in one embodiment, the constant C and/or the duty cycle $\tau/T$ may be determined in advance and stored in the mobile device 100 in association with the identification of the corresponding light source 200.

It is to be understood that the light propagation model represented by the equation (4) is only for the purpose of illustration, without suggesting any limitations as to scope of the subject matter described herein. Any other models, empirical data sets, or other appropriate methods that associate the propagation distance and received signal strength may be used. Depending on different definitions of the light propagation models, one or more properties of the light sources 200 in addition to or instead of the maximum emission power and duty cycle may be used in positioning. One or more of those required properties of the light source 200 may be included into the beacon and transmitted to the mobile device 100.

Still with reference to the model represented by the equation (4), if the number of available light sources 200 is four or more, the position of the mobile device 100 may be uniquely solved. Suppose that the mobile station 100 is held in the horizontal plane. This can be achieved, for example, by prompting the user to adjust the gesture of the mobile device 100. At this point, the distance d, irradiation angle $\varphi$ and incidence angle $\theta$ may all be represented by the position of the mobile device 100. Specifically, suppose the position of the mobile device 100, which is to be solved, is $<x_0, y_0, z_0>$. Then for an available light source 200 arranged at the position $<x, y, z>$, the distance d between the mobile device 100 and the light source 200 may be represented as $$d = \sqrt{(x_0-x)^2 + (y_0-y)^2 + (z_0-z)^2} \quad (5)$$

Further, it is reasonable to assume that the light sources 200 face downward, because the light sources 200 in most cases are installed on the ceiling, for example. Then the cosine of the irradiation angle $\varphi$ may be represented as $$\varphi = |z-z_0|/d \quad (6)$$

In the case that the light sensor 160 of the mobile device 100 faces squarely upward toward the ceiling, incidence angle $\theta$ is equal to the irradiation angle $\varphi$. In other cases, the likely or actual irradiation angle may be stored with the position information of the device.

As such, all the variants in the light propagation model may be represented by the position (more specifically, the coordinate values $x_0$, $y_0$ and $z_0$) of the mobile device 100. For n light source 200, a set of equations is obtained as follows:

$$\begin{cases} P_{r1} = C_1 \cdot \sin(\alpha_1 \pi) \cdot \frac{\cos\theta_1 \cdot \cos\phi_1}{d_1^2} \\ P_{r2} = C_2 \cdot \sin(\alpha_2 \pi) \cdot \frac{\cos\theta_2 \cdot \cos\phi_2}{d_2^2} \\ \quad \cdots \\ P_{rn} = C_n \cdot \sin(\alpha_n \pi) \cdot \frac{\cos\theta_n \cdot \cos\phi_n}{d_n^2} \end{cases} \quad (7)$$

With four or more available light sources 200 ($n \geq 4$), the coordinate values $x_0$, $y_0$ and $z_0$ of the mobile device 100 may be uniquely solved. In this embodiment, the distances between the mobile device 100 and light sources 200 are implicitly used in the trilateration or multilateration.

In some embodiments, solving the above equation set may be formulated as an optimization process that tries to minimize the linear mean square (LMS) error. For example, Newton's Method may be applied for the optimization although other optimization processes may be appropriate. The goal is to minimize the sum of absolute error between the left and right side of each equation in (7). By the way of example, in one embodiment, the initial value for each unknown is generated randomly. Then the optimization process is run multiple times to avoid local minima.

Specifically, it is seen that in the above example, the threshold is set to four, since four light sources 200 ensures a unique solution of the device position. Alternatively, in some cases, it is also possible to derive the unique position with just three light sources 210. Specifically, it would be appreciated that if the mobile device 100 is only able to perceive three light sources 200, solving the above equation set will result in two ambiguous solutions, one of which is fake. The fake one may be filtered out, for example, by common sense. For example, the light sources 210 installed on the ceiling usually have similar heights and are hence coplanar. In this event, due to even symmetry property of the cosine function in the model, the fake solution will occur or be determined to be positioned above the ceiling which is impossible in practice. Generally speaking, the lower limit for the threshold is three. That is, three light sources 200 are typically the minimum required number to directly calculate an exact position of the mobile device 100.

Additionally, it is to be understood that the assumptions in the above discussion is only for the purpose of illustration, without suggesting any limitations as to scope of use or functionality of the subject matter described herein. For example, if the mobile device 100 is in arbitrary orientation, in one embodiment, the orientation sensors such as inertial measurement units (IMUS) equipped on the mobile device 100 may be used to measure the device's attitude and transform back to horizontal attitude. Moreover, in case that not all the light sources 200 face downward, their angles can be pre-obtained via calibration and delivered to the receiver via beacons. In fact, even the light source 200 and the mobile device 100 are not perfectly facing down or up, slight imperfection has little impact to the location accuracy, as their impact to the distance estimation is via a cosine function that change slowly near zero. Further, more measurements may be performed to solve the general localization problem by introducing more constraints.

On the other hand, if the number of light sources 200 that are available to the mobile device 100 is below the threshold (three or four), which might be the case in practice, it is impossible to derive a unique solution by directly solving the equation set (7). For example, at a given instant, it is possible that the mobile device 100 is only able to receive light signals from one or two light sources 200. In order to deal with such situations, in some embodiments, one or more gestures of the mobile device 100 are used to provide additional assistance information. To this end, the user of the mobile device 100 may be involved. In one embodiment, the user is prompted to first hold the mobile device 100 horizontally and then rotate the device around Z-axis of the mobile device 100. When the mobile device 100 is oriented to one light source 200, the user is prompted to gradually pitch the mobile device 100. In the meantime, continuous measurements are performed to record the signal strengths of the light signals from that light source 200 at different pitch angles. In this process, one or more orientation sensors inside the mobile device 100 may be used to measure the irradiation and the incidence angles.

Figure 6A:
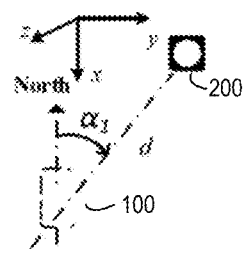
FIGS. 6A-6C illustrates change of measured strength of the received light signal as the device is pitched in accordance with one embodiment of the subject matter described herein.
Figure 6B:
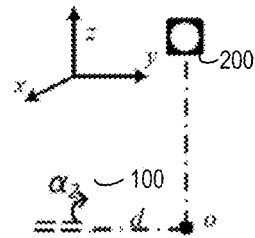

As an example, reference is made to FIG. 6A. When the mobile device 100 is initially held horizontally, the orientation angle (denoted as $\alpha_1$) between the North direction and a virtual line that connects the mobile device 100 and the light source 200 is measured. The received signal strength received when the mobile device 100 is oriented to the light source 200 is measured and recorded (denoted as $P_{r1}$). Then, as shown in FIG. 6B, the mobile device 100 is rotated from the horizontal attitude to the roughly vertical attitude for an angle $\alpha_2$ while keeping the light sensor(s) of the mobile device 100 facing the light source 200. It would be appreciated that the angle $\alpha_2$ would be larger than the incidence angle $\theta$ and irradiation angel $\varphi$ the point at which the light sensor(s) of the mobile device 100 faces squarely towards the light source 200 is passed.

Figure 6C:
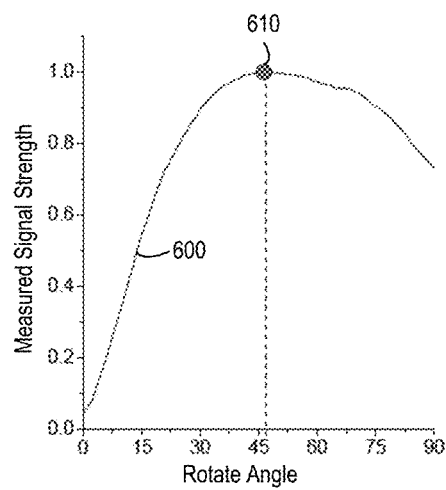

The measured signal strength of the light signal received from the light source 200 and the corresponding instantaneous pitching angle (around X-axis of the mobile device 100) are recorded and may be represented as a curve, as shown in FIG. 6C. It can be seen from the curve 600 that the measured signal strength increases until a peak point 610 is reached. After that point 610, due to the changing incidence angle $\theta$, the measured signal strength drops as the mobile device 100 is rotated. Thus, the peak point 610 is corresponding to the time instant when the mobile device 100 faces squarely to the light source 200. The corresponding pitched angle from the beginning to the peak point 610 is the desired incidence angle $\theta$ when the mobile device 100 was placed horizontally.

Now the incidence angle $\theta$, measured signal strength $P_{r1}$ and the angle $\alpha_1$ are available. With the light propagation model, for example, the one represented by the equation (5), the incidence angle $\theta$ and measured signal strength $P_{r1}$ ensure that all the candidate positions of the mobile device 100 are in a two-dimensional (2D) horizontal circle around each of the available light sources 200. Then, angle $\alpha_1$ is used to finally determine only one position in the circle, which is the accurate position of the mobile device 100. By obtaining and using such additional information via gestures of the mobile device 100, the position of the device 100 may be exactly determined based on the light propagation model even with limited number of light sources 200.

Alternatively to or additionally to the above described user assisted additional information, other known or determined information may be used to determine the current location of the mobile device. For example, prior known positions of the mobile device, prior detected light sources, and/or other location and guidance information of the device (e.g., GPS, Wifi, direction of travel over time, etc.) may be used to limit the possible number of potential locations of the mobile device.

Instead of the light propagation model, in some alternative embodiments, at step 440, a fingerprint-based approach may be applied to determine the position of the mobile device 100. In such embodiments, the light sources 200 can be uniquely identified, for example, by their respective identifications. An offline data collection process is executed in advance to collect fingerprints at one or more predetermined known positions. As used herein, the term "fingerprint" refers to a set of data at least consisting of measured signal strength, the identification of the light source(s) 200 from which the light signal is received, and the position where the measurement is performed. As an example, in one embodiment, a fingerprint is represented as a tuple in the form of <Light_Source_ID, Received_Signal_Strength, Position>. Any other suitable data structures are possible as well. These collected fingerprints are stored in a database, for example, at the server 310.

In such fingerprint-based positioning, it is unnecessary to know positions of the light sources 200. The only thing required is the identifications of the available light source 200. Therefore, in such embodiments, the beacon includes the identification of the associated light source 200. In operation, the identifications are obtained from the decoded beacon and used to identify one or more available light sources 210. Then the position of the mobile device 100 is determined by comparing the measured signal strength to the pre-stored fingerprints associated with the identified light source(s) 200. For example, in one embodiment, for a given light source(s) 200, a most matching fingerprint may be selected by finding the minimum difference between the measured signal strength and the signal strength recorded in the fingerprint. Then the position recorded in the matching fingerprint is used as the position estimation. In an alternative embodiment, a plurality of fingerprints with least signal strength differences are selected, and the average or weighted average of their positions is used as the position estimation. When there are two or more light sources 200, it is possible to perform the fingerprint matching for each of them, respectively, to determine two or more candidate positions. Then the candidate position may be combined (for example, averaged or weighted averaged) to obtain estimate of the position of mobile device 100.

It is to be understood that the model method and fingerprint method as discussed above may be used either alone or in combination. For example, in one embodiment, the fingerprint based positioning method may be used as an alternative of the model based method. In another embodiment, the fingerprint method may be used in conjunction with the model method. For example, when the model method is utilized, if the number of available light sources is insufficient for trilateration or multilateration, the fingerprint method may be applied. Moreover, the fingerprint approach may be used in combination with any other suitable sensing modalities such as WiFi, environment sound, and the like, to provide a more accurate estimation of the device position.

In order to ensure the reliability of positioning and reduce the waiting time, in some embodiments, frequency channelization and/or random channel hopping are adopted at the light sources 200. Generally, a primary challenge to reliable beaconing is the collision problem that may occur when multiple light sources 200 are uncoordinated and unsynchronized over shared light medium. It would be appreciated that it is usually difficult to coordinate among the light sources 200. Generally, in consideration of cost savings, a light source 200 like a LED lamp will not be equipped with extra sensor to find its neighbors. Even if such an extra sensor is indeed equipped, the actual deployment of light sources 200 (e.g., usually attached to ceiling or walls) makes it difficult for the light sources 200 to sense each other. This is very different from wireless radio cases. As a result, time division may not be feasible in many cases.

To this end, in some embodiments, the whole available light spectrum is channelized into a plurality of disjoint sub-carriers to provide synchronization among the light sources 200. The sub-carriers are referred to as "optical channels" or "channels." The channels have different spectral ranges and may be evenly distributed over the overall spectrum, for example. In one embodiment, it is possible to assign a static channel to each of the light sources 200. However, it would be appreciated that the coverage areas of light sources 200 and their intersections may change over time or entirely unknown. Therefore, in an alternative embodiment, a random channel hopping mechanism is used to avoid persistent collision among the light sources 200.

More specifically, a hopping period with a certain length is defined. For the current hopping period, the control unit 220 of light source 200 is configured to randomly select one of a plurality of channels, encode its beacon into the light signal, and transmits the beacon. Upon expiration of the current hopping period, the control unit 220 repeats the random channel selection, thereby hopping to another optical channel. It would be appreciated that as long as the number of channels is large enough compared with the number of contending light sources 200, such random hopping would significantly reduce or eliminate collisions.

It would be appreciated that in accordance with embodiments of the present invention, random channel hopping is not necessarily required to reduce collision. For example, in one embodiment, it is possible to configure the light sources 200 in advance such that each light source 200 stays in a fixed channel. With such predetermined channel allocation, the collision may be avoided.

Of course, it would be appreciated that even with the random channel hopping, collision might still occur in some cases. When a collision occurs, the mobile device 100 cannot correctly receive or decode the beacons of the collided light sources 200. In one embodiment, the mobile device 100 may wait for an additional hopping period(s) to receive light signals such that the beacon can be correctly decoded. In order to further reduce the likelihood of collision, in one embodiment, the number of channels is selected based on the length of the hopping period and the total number or range of numbers of light sources 200 in the environment.

In order to determine a suitable number of optical channels, in one embodiment, the waiting time of the device 100 may be characterized. Suppose that there are M light sources 200 (or at most M light sources) available in the environment and that the number of optical channels is N. In one embodiment, the waiting time $t_w$ may be formulated using the number and length of hopping periods, for example, as follows:

$$t_w(M) = k(M)\cdot\tau \tag{8}$$

where k represents the number of hopping periods and $\tau$ is the length of each hopping period. The waiting time $t_w$ and the number of hopping periods k are both functions of M. Given the fixed overall spectrum, $\tau$ is in proportion to N since increasing the number of channels leads to narrower channels and hence lower transmission rates.

Without synchronization among the light sources 200, the hopping periods of different light sources 200 are likely misaligned since the hopping period of a light source 200 refers to a local clock of the light source 200. Thus, one light source 200 may partially collide with another, leading to corrupted beacons from the two colliding sources. In case that the channel selection during each period is independent and uniformly distributed in [1, N], the probability that, in k consecutive hopping periods, one light source 200 does not collide with any other light sources 200 for at least one hopping period (which guarantees correct decoding at the mobile device 100) is:

$$p = 1 - \left[1 - \left(1 - \frac{1}{N}\right)^{2(M-1)}\right]^k \tag{9}$$

where M is a constant which is determined by the environment. Once N is given, the minimum value of k may be determined so that $p \geq P_0$, for example, as follows:

$$k(M) = \underset{k}{\mathrm{argmin}}\, p \geq P_0 \tag{10}$$

where $P_0$ represents a desired success rate. Once M and $P_0$ are given, the optimal N that minimizes the waiting time may be determined by combining the equations (8)-(10). For example, the optimal number of channels for M=3 is 7, and the corresponding number of hopping periods is 3.

In practice, the density of light sources 200 may vary with different environments. Therefore, it is difficult to find a globally optimal N for all situations. In one embodiment, the value of N may be selected by:

$$N = \underset{k}{\mathrm{argmin}}\, \underset{M \in M_{typical}}{\max}\, t_w(M) \tag{11}$$

wherein $M_{typical}$ represents the set of typical numbers of the light sources 200 that are observed by the mobile device 100. In one embodiment, $P_0$ and $M_{typical}$ are set to 90% and [3, 10], respectively. Accordingly, it is determined that N=30 and k=3. That is, in this embodiment, the available communication medium of the visual light is divided into 30 channels and the mobile device 100 waits for at most three hopping periods. During the waiting time, the mobile device 100 may receive multiple beacons from the same light source 200. In one embodiment, the beacon with the lowest signal strength is selected for further processing, which is less likely corrupted by other beacons.

As an example, in one embodiment, the frequency band [10 kHz, 19 kHz] is used. The frequency band is divided into 30 optical channels, each with 300 Hz bandwidth. The corresponding data rate at each channel is 120 bps. The length of hopping period is 0.7 s. Experiments show that the overall waiting time is around 2.1 s.

Furthermore, in accordance with embodiments of the subject matter described herein, the configuration information may dynamically be provided to the light sources 200 in various manners, such that the light sources 200 may be configured on the fly. This would be desired since some information like the position usually cannot be known unless the light source 200 is installed. To this end, in one embodiment, a light source 200 may be equipped with a radio (for example, Bluetooth, BLE, WiFi, or the like) receiver to receive configuration information using respective radio communication technology, or may be manually associated with a position relative to a map or other position framework by an installation expert.

In an alternative embodiment, in order to keep the costs at a low level, the configuration information may be provided to the light sources 200 by light communication. Specifically, a light source 200 may be equipped with an additional light sensor. In fact, it is also possible to simply reuse the light source 200 (for example, a LED) itself as the light sensor if the light source 200 is able to sense the light. In operation, the control unit 220 of the light source 200 may receive an incoming light signal from, for example, another light source 200. Then the control unit 220 may decode configuration information such as the position of a light source 200 from the incoming light signal. Based on the decoded configuration information, the control unit 220 may update the configuration and generate and broadcast the beacon accordingly.

Figure 7:
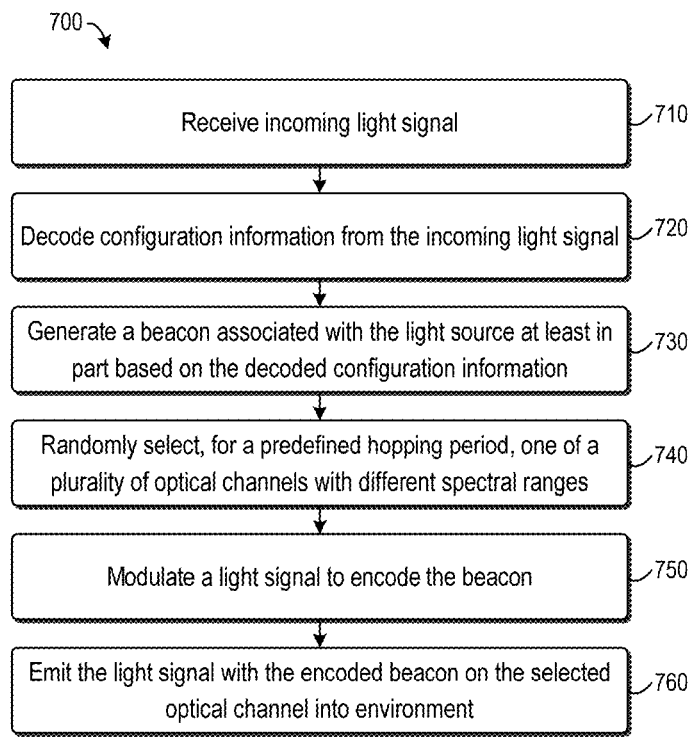
FIG. 7 illustrates a flowchart of a method at least in part implemented by a light source in accordance with one embodiment of the subject matter described herein.

FIG. 7 shows a flowchart of a method 700, that is at least part by a light source. Method 700 is entered at step 710 where incoming light signal is received. The incoming light signal may be emitted by another light source, a flash, or any other suitable light sources. Then at step 720, the configuration information is decoded from the incoming light signal. For example, the configuration information may include the position of the light source. At step 730, a beacon associated with the light source is generated at least in part based on the decoded configuration information. As discussed above, it is also possible to obtain the configuration information in a conventional or manual manner or use a radio receiver, for example.

At step 740, one of a plurality of optical channels is selected for a predefined hopping period. These optical channels each have different frequency ranges. Specifically, in one embodiment, the number of channels is determined based on the length of the hopping period and the number of light sources arranged in the environment. The beacon is encoded into the light signal at step 750, for example by modulation, and broadcasted at step 760 by the light signal emitted on the channel selected at step 740.

It is to be understood that though the dynamic configuration (steps 710 to 730) are shown to be first performed in the method 700, this is just for the purpose of illustration without suggesting any limitations. In practice, the dynamic configuration may be done at any suitable timing. For example, in one embodiment, it is possible to set the initial configuration conventionally or through radio communication and then update the configuration whenever necessary at runtime. In fact, the subject matter described herein can be even embodied with traditional light sources without dynamic configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A light source comprising:
a control unit configured to:
select, for a predefined hopping period, a number of optical channels from a plurality of optical channels with different spectral ranges, wherein the number of optical channels are selected based on a length of the predefined hopping period and a total number of light sources in an environment, and
modulate a light signal to encode a beacon associated with the light source; and
a light emitting unit configured to emit the light signal with the encoded beacon on a random one of the selected number of optical channels into the environment.

2. The light source of claim 1, wherein the control unit is further configured to:
receive an incoming light signal;
decode configuration information from the received incoming light signal; and
generate the beacon at least in part based on the decoded configuration information.

3. The light source of claim 2, wherein receiving the incoming light signal comprises:
waiting for an additional hopping period to receive the incoming light signal; and
selecting the incoming light signal encoded with a beacon having the lowest signal strength.

4. The light source of claim 1, wherein the light source is equipped with a radio receiver to receive configuration information using respective radio communication technology.

5. The light source of claim 1, wherein the light source is manually associated with a position relative to a map.

6. The light source of claim 1, wherein the light source is equipped with a light sensor.

7. The light source of claim 1, wherein the light source is a flash light.

8. The light source of claim 1, wherein the light source is configured as a light sensor to emit light and sense emitted light.

9. In an environment, a system comprising:
at least one light source comprising:
a control unit configured to select, for a predefined hopping period, a number of optical channels from a plurality of optical channels with different spectral ranges, wherein the number of optical channels are selected based on a length of the predefined hopping period and a total number of light sources in the environment, and to modulate a light signal to encode a beacon associated with the at least one light source, and
a light emitting unit configured to emit the light signal with the encoded beacon on a random one of the selected number of optical channels into the environment; and
a device comprising:
a light sensor configured to receive the light signal with the encoded beacon from the at least one light source, and
a processor configured to determine a position of the device at least in part based on a beacon associated with the at least one light source that is decoded from the received light signal with the encoded beacon, a measured signal strength of the received light signal with the encoded beacon, and a number of the at least one light source, wherein the measured signal strength is measured from a magnitude of a baseband frequency component of the received light signal with the encoded beacon.

10. The system of claim 9, wherein the control unit of the at least one light source is further configured to:
receive an incoming light signal;
decode configuration information from the received incoming light signal; and
generate the beacon at least in part based on the decoded configuration information.

11. The system of claim 10, wherein receiving the incoming light signal comprises:
waiting for an additional hopping period to receive the incoming light signal; and
selecting the incoming light signal encoded with a beacon having the lowest signal strength.

12. The system of claim 9, wherein the light sensor of the device is further configured to:
responsive to a collision being detected in the received light signal, receive the light signal from the least one light source in an additional hopping period.

13. The system of claim 9, wherein the processor of the device is further configured to:
determine a position of the at least one light source based on the decoded beacon; and
determine the position of the device based on the position of the at least one light source, wherein the measured signal strength and the number of the at least one light source are determined according to a light propagation model, the light propagation model at least associating the measured signal strength and a propagation distance of the received light signal.

14. The system of claim 13, wherein the processor of the device is further configured to:
responsive to the number of the at least one light source being greater than a predefined threshold, apply trilateration or multilateration to determine the position of the device based on the position of the at least one light source and the measured signal strength according to the light propagation model.

15. The system of claim 13, wherein the processor of the device is further configured to:
responsive to the number of the at least one light source being less than a predefined threshold, detect at least one gesture of the device; and
determine the position of the device based on the position of the at least one light source, the measured signal strength, and the detected at least one gesture of the device according to the light propagation model.

16. The system of claim 13, wherein the light propagation model associates the measured signal strength and the propagation distance of the received light signal at least in part based on a duty cycle and a maximum emission power of the least one light source, and wherein the processor of the device is further configured to:
obtain, from the decoded beacon, information about at least one of the duty cycle and the maximum emission power.

17. The system of claim 9, wherein the processor of the device is further configured to:
obtain identification of the at least one light source from the decoded beacon;
retrieve, based on the identification, a plurality of predetermined signal strengths of the least one light source at a plurality of predetermined positions; and
determine the position of the device by comparing the measured signal strength with the plurality of predetermined signal strengths.

18. The system of claim 17, further comprising an offline data collection database for collecting the identification of the at least one light source from the decoded beacon.

19. The system of claim 9, wherein a spatial sphere of the at least one light source is determined, a position of the at least one light source is at a center position of the spatial sphere, and a distance between the device and the at least one light source is a radius of the spatial sphere.

20. The system of claim 9, wherein the at least one light source is configured as a light sensor to sense emitted light.

* * * * *